Aug. 21, 1934.  H. E. IVES  1,970,936
PHOTOGRAPHY
Filed March 20, 1930
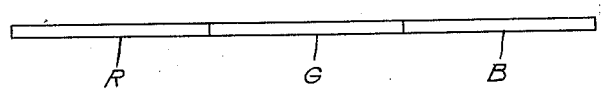
Fig. 1
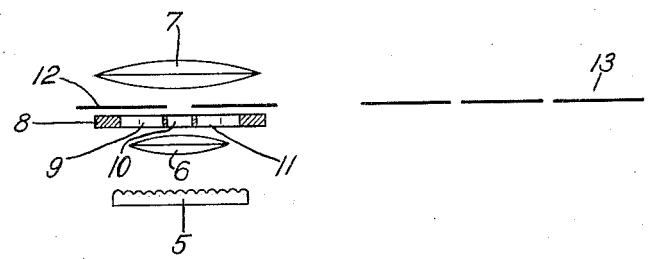
Fig. 3
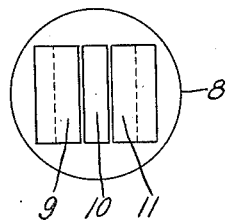
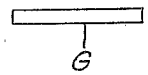
Fig. 2
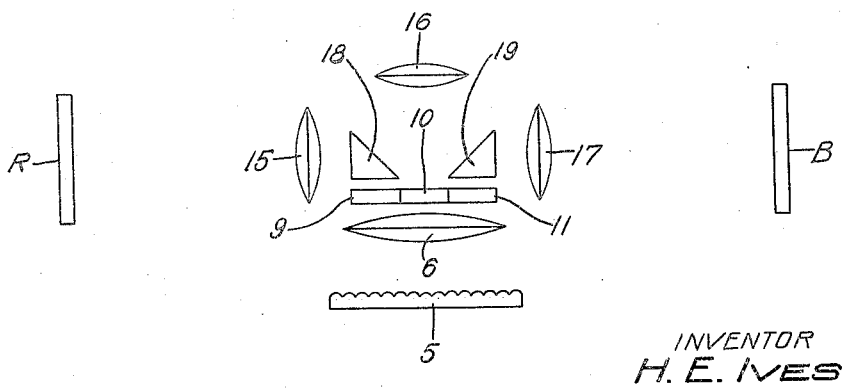
INVENTOR
H. E. IVES
BY
Stanley B. Kent.
ATTORNEY Patented Aug. 21, 1934

1,970,936

UNITED STATES PATENT OFFICE 1,970,936

PHOTOGRAPHY

Herbert E. Ives, Montclair, N. J., assignor to Bell Telephone Laboratories, Incorporated, New York, N. Y., a corporation of New York Application March 20, 1930, Serial No. 437,342

4 Claims. (Cl. 88—24)

This invention relates to photography and more particularly to methods and means for producing photographic effects in colors.

In a well known form of color photography, a film with ridged lenticular elements on the surface opposite to the light sensitive emulsion is used. This film is exposed in a camera, the lens of which is provided with three adjacent color filters such as are used in producing black and white color records. The ridged surface faces the lens and the photographic emulsion on the side of the film opposite the ridges is thus exposed to three juxtapositioned linear color record images for each lenticular ridge. The exposed film during development is reversed to form a positive which may be projected on a screen to produce an image in natural colors by means of a projection lantern, the lens of which is also provided with three adjacent color filters. The lenticular elements may take other forms, such as spherical lenses closely positioned side by side.

An object of the present invention is the production of color records on lenticular film or like photographic material from separation color records.

By way of illustration a limited number of embodiments of the invention will be described.

In one arrangement a ridged lenticular film is exposed to each of a set of separation color records in succession, each through a separate portion of the copying lens corresponding to the portion which might be used for the given color in projecting. In another arrangement the exposures are made simultaneously. Since only one of the separation color records at a time can occupy a position for direct imaging on the lenticular film, prisms are used to direct the light from the other two through the proper portions of the copying lens.

The invention will now be described more in detail having reference to the accompanying drawing.

Fig. 1 shows diagrammatically an arrangement for exposing a ridged lenticular film successively in accordance with separation color records.

Fig. 2 is a modified arrangement for making all of the exposures simultaneously.

Fig. 3 is a face view of an aperture plate.

Like reference characters are used to represent identical elements in the several figures.

Referring now to Fig. 1, a ridged film 5 is to be exposed in accordance with a set of black and white transparency three color records R, G and B to produce a transparency suitable for projecting images in color. The records R, G and B determine respectively the red, green and blue components of the image to be produced. The lens 6 is adapted to form an image of the separation color records in succession on the film 5. The lens 7 is an auxiliary lens to aid in focusing the records on the film 5. A triple aperture diaphragm 8 is provided with three clear apertures 9, 10 and 11, the portions between the dotted lines (see Fig. 3) corresponding to the portions of the lens 6 which are to be used during the exposure of the film 5 to the red, green and blue separation color records respectively. Each of the lenticular ridges on the film 5 is adapted to form juxtapositioned linear images of the three apertures 9, 19 and 11 on the sensitive emulsion on the plane side of the film 5. A laterally movable apertured diaphragm 12 is adapted to uncover the proper amount of one only of the triple apertures at a time.

The procedure in exposing a film 5 is to move each of the records R, G and B in turn in position to be imaged on the film 5 and to move the diaphragm 12 to expose the corresponding apertures 9, 10 and 11 in turn. The records R, G and B are illuminated from the side opposite the camera by a light source such that light from each point of the record reaches all parts of the triple apertures of diaphragm 8.

If the records R, G and B are positives, the exposed film 5 is to be developed and given a photographic reversal following a well known process used in producing motion picture film. If the records R, G and B are negatives, the film 5 is merely developed. In this case, however, it is necessary to insure that the spaces between the strips of photographic action are completely filled up, for while in the reversal process the spaces are black, they will be clear in copying from a negative and may throw in a veil of light which will dilute the colors. This filling-up can be accomplished by choosing the proper width for the apertures in diaphragms 12 and 8 by a supplementary exposure through apertures in diaphragm 13 which will throw light to either side of the three picture strips behind each ridge. For such supplementary exposure, the diaphragm 12 is replaced by the diaphragm 13, a portion of apertures 9 and 11 to the left and right of the dotted lines respectively (see Fig. 3) then being used.

The arrangement of Fig. 2 is fundamentally the same as that of Fig. 1. An image of each of the color records R, G and B is formed at the emulsion of the film 5 through the corresponding apertures 9, 10 and 11, respectively. These images are formed by the lens 6 assisted by the lenses 15, 16 and 17 for the records R, G and B respectively. These last mentioned lenses take the place of lens 7 of Fig. 1. The paths of the light rays, however, from the records to the apertures are entirely separate, this separation being accomplished by the use of prisms or mirrors 18 and 19 which change the direction of the rays from records R and B respectively. Exposure of film 5 to the three records R, G and B occurs simultaneously. The diaphragm 13 may also be used with the arrangement of Fig. 2 for filling up, when producing positives from negatives.

Suitable housings may be provided for the elements of Figs. 1 and 2 to exclude unwanted light and to properly control the time of exposure of the film 5.

The invention is not confined to the use of ridged lenticular film. Other types of lenticular film or like emulsion carrying material may be used. The term "film", as used herein, denotes not only the celluloid film of well known kind, but also is intended to cover forms of emulsion carrying material other than such celluloid film, provided the lenticular elemental structure is retained. This invention makes possible the duplication of lenticular color records.

The invention may be embodied in a variety of forms which come within the scope of the appended claims.

What is claimed is:

1. In a photographic copying device, a plurality of separation color records, a lenticular film, a lens for imaging each of said records on said film, a diaphragm having a plurality of apertures therein, a prism to direct the image forming light from one of said records through an aperture in said diaphragm individual thereto, and a large lens positioned between said diaphragm and said lenticular film to direct the image forming light to the film.

2. In a photographic copying device, a plurality of separation color records, a lenticular film, a lens for imaging each of said records on said film, a diaphragm having a plurality of apertures therein, a prism to direct the image forming light from one of said records through an aperture in said diaphragm individual thereto, and means to direct light at another time through an aperture occupying a position overlapping one edge of the position occupied by one of said individual apertures.

3. In a photographic copying device, a plurality of lenses adapted to form simultaneously separate images of a plurality of separation color records, respectively, a lenticular light sensitive emulsion carrying element adapted to receive the images of said records, a diaphragm having a plurality of apertures therein, and a plurality of prisms positioned between said records and said diaphragm to direct in separate paths the image forming light for each record, respectively, through an aperture in said diaphragm individual thereto.

4. In a photographic copying device, a plurality of separation color records positioned at substantial distances from each other, a lenticular light sensitive emulsion carrying element adapted to receive an image from each of said separation color records, a diaphragm having a plurality of separate apertures therein, a plurality of lenses in combination with a plurality of light direction changing prisms adapted to direct the image forming light from each of said records, respectively, in separate paths through the individual apertures in said diaphragm, a large lens positioned between said diaphragm and said lenticular light sensitive element to direct the image forming light from said diaphragm to said light sensitive element.

HERBERT E. IVES.